US009309161B2

(12) United States Patent
Chen et al.

(10) Patent No.: US 9,309,161 B2
(45) Date of Patent: Apr. 12, 2016

(54) SYSTEMS AND METHODS OF STORING COMBUSTION WASTE PRODUCTS

(71) Applicants: UNIVERSITY OF NORTH CAROLINA AT CHARLOTTE, Charlotte, NC (US); CHINA UNIVERSITY OF MINING & TECHNOLOGY, Jiangsu (CN)

(72) Inventors: Shen-En Chen, Charolotte, NC (US); Peng Wang, Charlotte, NC (US); Xiexing Miao, Jiangsu (CN); Qiyan Feng, Jiangsu (CN); Qianlin Zhu, Jiangsu (CN)

(73) Assignees: China University of Mining & Technology, Xuzhou, Jiangsu Province (CN); University of North Carolina at Charlotte, Charlotte, NC (US)

( * ) Notice: Subject to any disclaimer, the term of this patent is extended or adjusted under 35 U.S.C. 154(b) by 0 days.

(21) Appl. No.: 14/423,986

(22) PCT Filed: Aug. 30, 2013

(86) PCT No.: PCT/US2013/057611
§ 371 (c)(1),
(2) Date: Feb. 25, 2015

(87) PCT Pub. No.: WO2014/036455
PCT Pub. Date: Mar. 6, 2014

(65) Prior Publication Data
US 2015/0246852 A1    Sep. 3, 2015

Related U.S. Application Data

(60) Provisional application No. 61/694,852, filed on Aug. 30, 2012.

(51) Int. Cl.
*C04B 7/02* (2006.01)
*B01D 53/62* (2006.01)
(Continued)

(52) U.S. Cl.
CPC ............ *C04B 40/0236* (2013.01); *B01D 53/02* (2013.01); *B01D 53/62* (2013.01);
(Continued)

(58) Field of Classification Search
CPC .................................. B01D 53/62; C04B 7/02
USPC ........................................... 423/220; 106/713
See application file for complete search history.

(56) References Cited

U.S. PATENT DOCUMENTS 4,117,060 A * 9/1978 Murray ............................ 264/82
4,226,921 A * 10/1980 Tsang ........................... 429/104
(Continued)

FOREIGN PATENT DOCUMENTS

| JP | 08-067577 A | 3/1996 |
| WO | 85-00587 A1 | 2/1985 |

OTHER PUBLICATIONS

Notification Concerning Transmittal of International Preliminary Report on Patentability for corresponding PCT Application No. PCT/US2013/057611, mailed Mar. 12, 2015, 10 pages.
(Continued)

*Primary Examiner* — Paul Marcantoni
(74) *Attorney, Agent, or Firm* — Smith Moore Leatherwood LLP; J. Clinton Wimbish

(57) ABSTRACT

In one aspect, methods of storing one or more combustion waste products are described herein. Combustion waste products stored by a method described herein can include solid combustion waste products such as coal ash and/or gaseous combustion products such as carbon dioxide. In some embodiments, a method of storing carbon dioxide comprises providing a carbon dioxide storage medium comprising porous concrete having a macroporous and microporous pore structure and flowing carbon dioxide captured from a combustion flue gas source into the pore structure of the porous concrete.

19 Claims, 9 Drawing Sheets

(51) Int. Cl.
*C04B 40/02* (2006.01)
*B01D 53/02* (2006.01)
*B01J 20/04* (2006.01)
*B01J 20/28* (2006.01)
*B01J 20/10* (2006.01)
*C04B 28/02* (2006.01)
*C04B 28/10* (2006.01)
*C04B 111/00* (2006.01)

(52) U.S. Cl.
CPC ............... *B01J 20/041* (2013.01); *B01J 20/10* (2013.01); *B01J 20/28078* (2013.01); *C04B 28/02* (2013.01); *C04B 28/10* (2013.01); *B01D 2253/25* (2013.01); *B01D 2253/308* (2013.01); *B01D 2257/504* (2013.01); *B01J 2220/4887* (2013.01); *B09B 2220/06* (2013.01); *C04B 2111/00017* (2013.01); *C04B 2111/00724* (2013.01); *Y02C 10/04* (2013.01); *Y02C 10/08* (2013.01); *Y02P 40/18* (2015.11); *Y02W 30/92* (2015.05)

(56) References Cited

U.S. PATENT DOCUMENTS

| | | | |
|---|---|---|---|
| 5,935,317 | A | 8/1999 | Soroushian et al. |
| 8,114,367 | B2* | 2/2012 | Riman et al. ................... 423/210 |
| 8,845,940 | B2* | 9/2014 | Niven et al. ...................... 264/82 |
| 2006/0185560 | A1* | 8/2006 | Ramme et al. ................ 106/672 |
| 2008/0245274 | A1* | 10/2008 | Ramme ......................... 106/679 |
| 2010/0083880 | A1 | 4/2010 | Constantz et al. |
| 2010/0132591 | A1 | 6/2010 | Constantz et al. |
| 2011/0289901 | A1* | 12/2011 | Estes et al. ...................... 60/274 |
| 2014/0216303 | A1* | 8/2014 | Lee et al. ....................... 106/638 |

OTHER PUBLICATIONS

International Search Report and Written Opinion for PCT/US2013/057611, mailed Nov. 12, 2013, 11 pages.

* cited by examiner

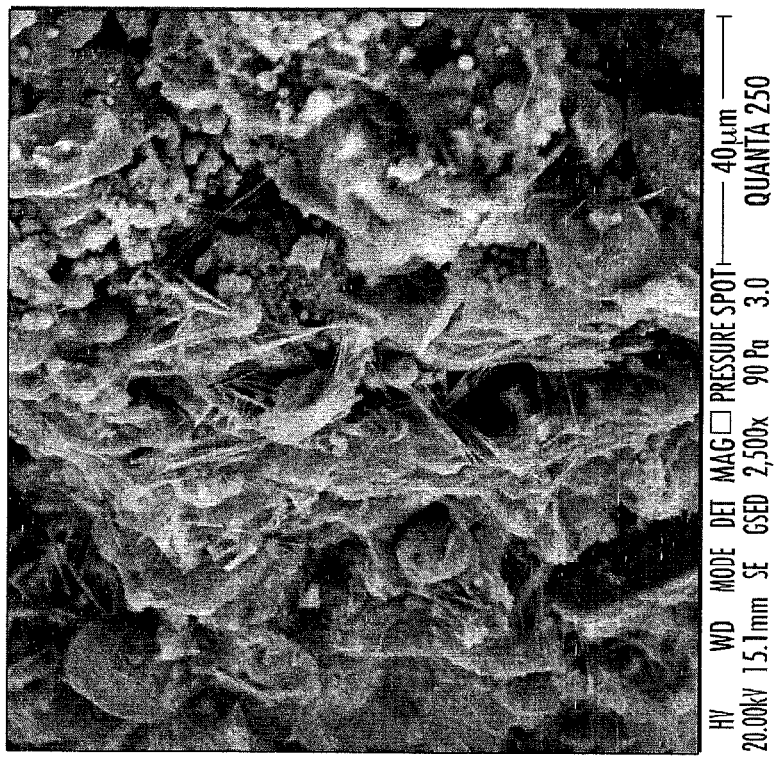
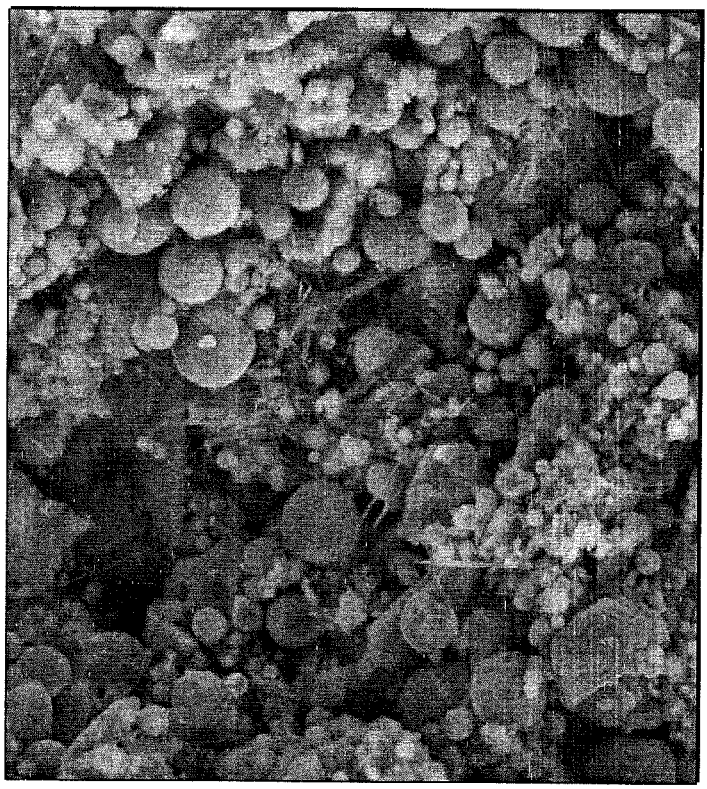
FIG. 9A
FIG. 9B

SYSTEMS AND METHODS OF STORING COMBUSTION WASTE PRODUCTS

CROSS REFERENCE TO RELATED APPLICATION

This application is a national stage application under 35 U.S.C. §371 of International Application No. PCT/US2013/057611, filed Aug. 30, 2013, which claims priority pursuant to 35 U.S.C. §119(e) to U.S. Provisional Patent Application Ser. No. 61/694,852, filed on Aug. 30, 2012, each of which are hereby incorporated by reference in their entireties.

STATEMENT REGARDING FEDERALLY SPONSORED RESEARCH

This invention was made with government support under contract number DE-FC26-06NT43029 awarded by the United States Department of Energy. The government has certain rights in the invention.

FIELD

This invention relates to systems and methods of storing combustion waste products and, in particular, to systems and methods of storing coal ash and/or carbon dioxide ($CO_2$).

BACKGROUND

Fossil fuels currently provide approximately 85 percent of the world's energy needs, and the use of fossil fuels will likely continue through the coming decades due to these fuels' low cost and continued availability. However, the combustion of fossil fuels also raises concerns regarding global warming due to the production and release into the atmosphere of large amounts of greenhouse gases such as carbon dioxide. One method of reducing the amount of carbon dioxide emission caused by the combustion of fossil fuels without also reducing the amount of fossil fuel consumption is to sequester carbon dioxide in reservoirs such as deep geological or oceanic reservoirs. However, geological and oceanic sequestration methods cannot sequester as much carbon dioxide as is emitted through the combustion of fossil fuels. Further, geological sequestration generally requires maintaining high pressures at the sequestration site. In addition, various thermodynamic and kinetic factors can cause the degradation of reservoirs over time, leading to the release of previously sequestered carbon dioxide.

Therefore, there exists a need for improved systems, methods, and compositions for storing combustion waste products such as carbon dioxide.

SUMMARY

In one aspect, methods of storing one or more combustion waste products are described herein which, in some embodiments, may provide one or more advantages over other methods. For example, in some cases, combustion waste products stored by a method described herein can include both solid combustion waste products such as coal ash and gaseous combustion products such as carbon dioxide or another carbon-containing gas. Moreover, in some instances, a method described herein can be used to store a large amount of combustion waste product in a stable manner for a long period. Further, in some embodiments, a method described herein can be carried out more quickly and/or more energy-efficiently than some other methods. In some cases, for example, a method of storing one or more combustion waste products described herein can be carried out at ambient temperature over the course of two days or less.

In some embodiments, a method of storing a combustion waste product comprises storing coal ash. A method of storing coal ash, in some cases, comprises mixing coal ash and cement to provide an uncured concrete composition and curing the uncured concrete composition.

In other embodiments, a method of storing a combustion waste product comprises storing carbon. A method of storing carbon, in some instances, comprises providing a carbon dioxide storage medium comprising porous concrete having a macroporous and microporous pore structure and flowing carbon dioxide captured from a combustion flue gas source into the pore structure of the porous concrete. In addition, in some embodiments, the porous concrete used to sequester the carbon dioxide can also comprise a solid combustion waste material. In some cases, for instance, the porous concrete comprises a mixture of coal ash and cement. Thus, in some embodiments, a method described herein can be used to store both solid and gaseous combustion waste products.

In another aspect, carbon storage systems are described herein. In some embodiments, a carbon storage system comprises a source of carbon dioxide captured from combustion flue gas and a carbon dioxide storage medium comprising porous concrete, wherein the porous concrete has a macroporous and microporous pore structure. In addition, the system can further comprise one or more conduits for delivering the captured carbon dioxide to the porous concrete.

In still another aspect, compositions comprising one or more combustion waste products are described herein. For example, in some embodiments, a composition described herein comprises porous concrete having a macroporous and microporous pore structure, wherein the porous concrete comprises a mixture of coal ash and cement. In other embodiments, a composition described herein comprises porous concrete having a macroporous and microporous pore structure and carbon dioxide residing within the porous concrete.

The coal ash and/or carbon dioxide of a composition described herein, in some cases, can be present in a broad range of amounts. In some embodiments, for instance, coal ash can be present in the porous concrete of a composition in an amount between about 5 weight percent and about 90 weight percent, based on the total weight of the porous concrete. Carbon dioxide can be present in the porous concrete of a composition in an amount greater than the atmospheric concentration of carbon dioxide, such as an amount greater than about 1 weight percent of the porous concrete. Further, in some embodiments, carbon dioxide can be present in the porous concrete of a composition described herein with high penetration. For example, in some cases, carbon dioxide can be present in the porous concrete at a depth of more than 5 cm or more than 100 cm from the surface of the porous concrete.

In another aspect, apparatus and methods of measuring the sorption of a gas such as carbon dioxide by a sorption material such as porous concrete are described herein. In some embodiments, a method of measuring the sorption of a gas by a sorption material described herein comprises disposing the sorption material in a sample chamber having a first volume; disposing the gas at an initial pressure in a reference chamber having a second volume; removing the atmosphere from the sample chamber to provide a vacuum in the sample chamber; transferring at least a portion of the gas from the reference chamber to the sample chamber; measuring the pressure of the gas in the sample chamber; and determining the amount of sorption of the gas by the sorption material based on the first volume, the second volume, the initial pressure, and the measured pressure of the gas in the sample chamber. Further, in some cases, the sample chamber and the reference chamber are maintained at a constant temperature during the sorption process. In addition, in some embodiments, the porous concrete is at least partially uncured and the method further comprises curing the porous concrete.

Accordingly, an apparatus described herein for measuring the sorption of a gas by a sorption material can comprise a sample chamber having a first volume; a reference chamber having a second volume and being in selective fluid communication with the sample chamber; a source of sorption gas adapted to provide the sorption gas to the reference chamber; a pressure gauge configured to measure the pressure inside the sample chamber; and an isothermal bath adapted to maintain the sample chamber and the reference chamber at a constant temperature during measurement of the sorption of the sorption gas by the sorption material. Further, in some embodiments, the sample chamber is adapted to contain a sorption material having a mass of at least about 1 g.

In yet another aspect, methods of backfilling are described herein. In some embodiments, a method of backfilling comprises disposing a backfill material in a void to at least partially fill the void, the backfill material comprising a composition described herein. For example, in some instances, the backfill material comprises porous concrete having a macroporous and microporous pore structure and carbon dioxide residing within the porous concrete in an amount greater than 1 weight percent of the porous concrete. The porous concrete of a backfill material described herein can also comprise a mixture of coal ash and cement. Moreover, the porous concrete of a backfill material described herein can be substantially cured or at least partially uncured.

These and other embodiments are described in greater detail in the detailed description which follows.

BRIEF DESCRIPTION OF THE DRAWINGS

FIG. 9A illustrates an SEM image of a composition according to one embodiment described herein.

FIG. 9B illustrates an SEM image of a composition according to one embodiment described herein.

DETAILED DESCRIPTION

Figure 1:
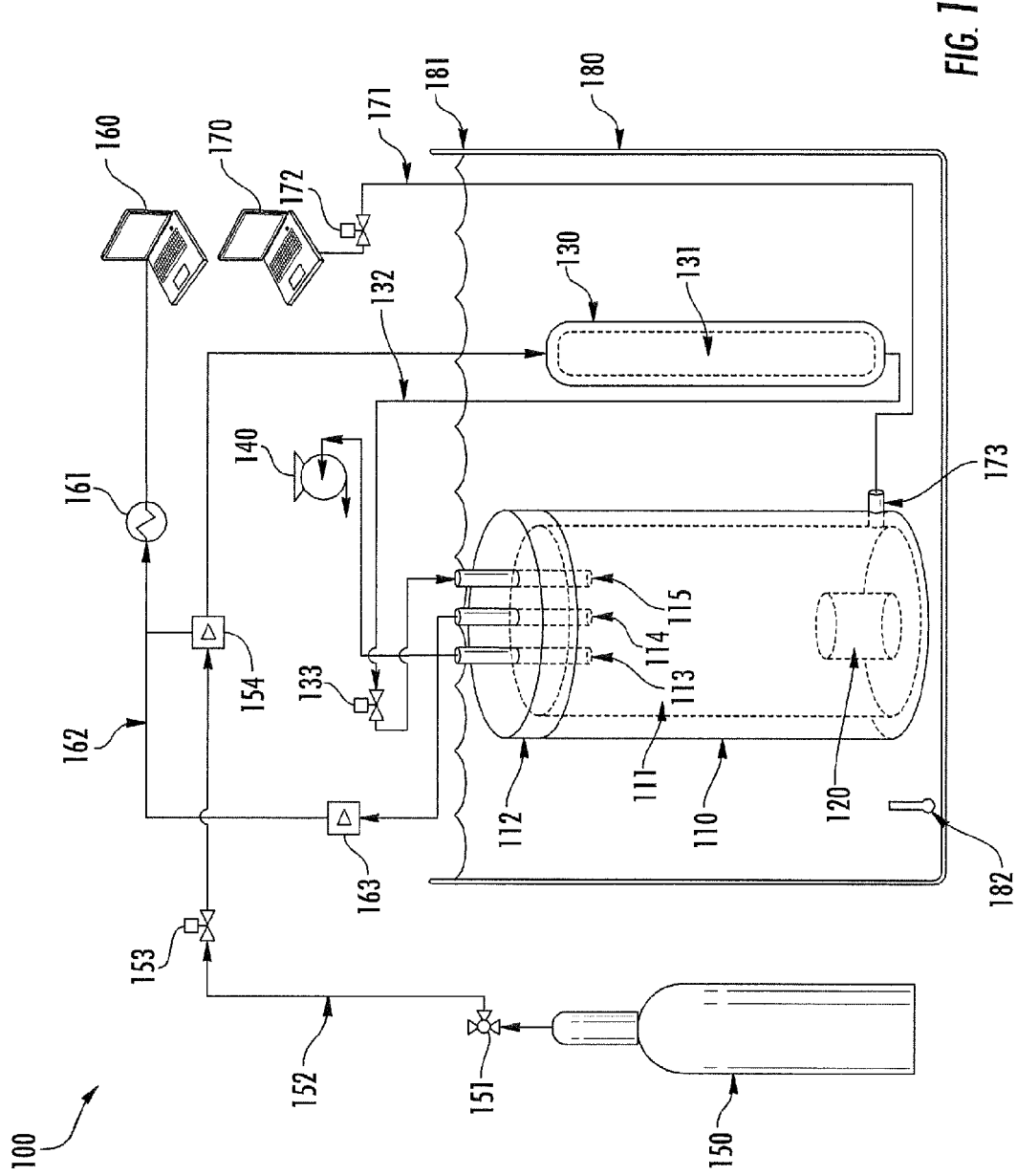
FIG. 1 illustrates an apparatus for carrying out a method of storing one or more combustion waste products and/or measuring the sorption of a gas according to one embodiment described herein.

Embodiments described herein can be understood more readily by reference to the following detailed description, examples and drawings and their previous and following descriptions. Elements, apparatus and methods described herein, however, are not limited to the specific embodiments presented in the detailed description, examples and drawings. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

I. Methods of Storing One or More Combustion Waste Products

In one aspect, methods of storing one or more combustion waste products are described herein. The combustion waste products can comprise a solid combustion waste product such as coal ash and/or a gaseous combustion waste product such as carbon dioxide.

In some embodiments, a method of storing a combustion waste product comprises storing carbon by storing a carbon-containing gas such as carbon dioxide. In some cases, a method of storing carbon described herein comprises providing a carbon dioxide storage medium comprising porous concrete having a macroporous and microporous pore structure and flowing carbon dioxide captured from a combustion flue gas source into the pore structure of the porous concrete. As understood by one of ordinary skill in the art, it is also possible to flow carbon dioxide into the pore structure of the porous concrete, wherein the carbon dioxide was not necessarily captured from a combustion flue gas source.

Turning now to specific steps of methods of storing carbon, a method of storing carbon described herein comprises providing a carbon dioxide storage medium comprising porous concrete having a macroporous and microporous pore structure. A porous concrete having a macroporous and microporous pore structure, for reference purposes herein, comprises both macropores and micropores. Macropores, in some embodiments, can have a diameter or size greater than about 100 µm. In some cases, macropores can have a diameter or size between about 100 µm and about 1000 µm, between about 200 µm and about 800 µm, or between about 300 µm and about 700 µm. In contrast, micropores can have smaller sizes. For example, in some embodiments, micropores of a porous concrete described herein can have a diameter or size of less than about 50 µm or less than about 10 µm. In some cases, micropores can have a diameter or size between about 50 nm and about 50 µm, between about 100 nm and about 20 µm, or between about 500 nm and about 10 µm. Thus, the pore structure of a porous concrete described herein can have a multi-modal pore size distribution such as a bi-modal size distribution. As understood by one of ordinary skill in the art, the diameter or size of a pore is the diameter or size of the opening of the pore, as opposed to the length of the pore.

Moreover, the pores of a porous concrete described herein can have any shape. Thus, the "diameters" or "sizes" recited herein are not limited to pores having particular shapes such as circular shapes but can instead refer to the longest dimension of a pore opening.

Further, a porous concrete described herein can have a porosity or void fraction of about 10 percent to about 70 percent, about 15 percent to about 30 percent, or about 20 percent to about 50 percent. The porosity or void fraction of a porous concrete, for reference purposes herein, refers to the volume of voids in the porous concrete compared to the total volume of the porous concrete.

In addition, a porous concrete described herein can comprise or be formed from any cement or filler materials not inconsistent with the objectives of the present invention. For example, in some embodiments, a porous concrete comprises or is formed from an inorganic cement comprising calcium and/or silicon salts or oxides. In some cases, a porous concrete described herein comprises or is formed from a hydraulic cement or lime-containing cement. In some embodiments, a porous concrete described herein comprises or is formed from a Portland cement. In some embodiments, a porous concrete described herein can include one or more of $SiO_2$, $Al_2O_3$, $Fe_2O_3$, $CaO$, $Ca(OH)_2$, $CaSO_4 \cdot 2H_2O$, and mixtures and combinations thereof, such as tricalcium silicate, dicalcium silicate, tricalcium aluminate, or tetracalcium aluminoferrite.

A porous concrete described herein can also include one or more filler materials and/or one or more blowing agents or foaming agents mixed with a cement described hereinabove. Any combination of a cement described herein with a filler material described herein and/or a blowing agent or foaming agent described herein not inconsistent with the objectives of the present invention may be used. In some embodiments, for example, a filler material comprises one or more of sand, gravel, and crushed stone. Further, in some cases, a filler material comprises a solid combustion waste product such as coal ash. Any coal ash not inconsistent with the objectives of the present invention may be used. For example, the coal ash can comprise fly ash and/or bottom ash. A blowing agent or foaming agent, for reference purposes herein, comprises a species that can facilitate the formation of pores with the porous concrete, either by producing a gas or in some other manner. Non-limiting examples of blowing agents or foaming agents suitable for use in some embodiments described herein include solid inorganic materials such as aluminum powder or another metal powder; low molecular weight organic species such as butane, pentane, or another alkane; surfactants; and vegetable or animal proteins. Other blowing or foaming agents may also be used.

Moreover, a porous concrete described herein can comprise a cement described hereinabove and/or filler material described hereinabove and/or blowing or foaming agent described hereinabove in any amount not inconsistent with the objectives of the present invention. For example, in some cases, a porous concrete has a composition described in Table 1 below. The amounts provided in Table 1 are weight percents of each component, based on the total weight of the porous concrete prior to any carbonation of the porous concrete as described herein.

TABLE 1

| Cement Component (weight percent) | Filler Material (weight percent) | Blowing/ Foaming Agent (weight percent) | Water (weight percent) |
|---|---|---|---|
| 90-100 | 0-10 | 0-15 | Balance |
| 75-95 | 5-25 | 0-15 | Balance |
| 50-80 | 20-50 | 0-15 | Balance |
| 40-60 | 40-60 | 0-15 | Balance |
| 30-50 | 50-70 | 0-15 | Balance |
| 15-30 | 70-85 | 0-15 | Balance |
| 5-20 | 80-95 | 0-15 | Balance |
| 1-10 | 90-95 | 0-15 | Balance |

Methods of storing carbon described herein also comprise flowing carbon dioxide captured from a combustion flue gas source into the pore structure of a porous concrete. The carbon dioxide can be captured or obtained in any manner and from any combustion flue gas source not inconsistent with the objectives of the present invention. For example, in some cases, the combustion flue gas source comprises a fossil fuel-burning apparatus such as an industrial furnace, boiler, steam generator, or power plant. In some cases, the combustion flue gas source is a coal-burning, petroleum-burning, or natural gas-burning furnace, boiler, steam generator, or power plant. Other sources of a combustion flue gas may also be used. Moreover, in some embodiments, the source of the combustion flue gas is a stationary source, as opposed to a mobile source such as an automobile, boat, airplane, or other vehicle.

Further, flowing carbon dioxide captured from a combustion flue gas source into the pore structure of a porous concrete described herein, in some embodiments, is carried out using one or more conduits disposed between the combustion flue gas source and the porous concrete.

Additionally, flowing carbon dioxide captured from a combustion flue gas source into the pore structure of a porous concrete described herein can result in the sorption of the carbon dioxide by the porous concrete. "Sorption," for reference purposes herein, can comprise an absorption and/or adsorption process. Sorption can also include chemisorption and/or physisorption. For example, in some cases, carbon dioxide is chemisorbed by the porous concrete through a carbonation reaction, such as a reaction between the carbon dioxide and a metal oxide (such as CaO) to form a metal carbonate (such as $CaCO_3$). Thus, in some embodiments, carbon dioxide disposed or residing in porous concrete by chemisorption can be present in the porous concrete as a carbonate, such as a calcium carbonate. In some cases, the carbon dioxide is both chemisorbed and physisorbed by the porous concrete.

Further, a method described herein can permit the rapid sorption of carbon dioxide, including in large amounts. In some embodiments, for example, the carbon dioxide is sorbed by the porous concrete at a rate of at least about 0.001 grams of carbon dioxide, at least about 0.01 grams of carbon dioxide, or at least about 0.05 grams of carbon dioxide per gram of porous concrete per minute. In some embodiments, the carbon dioxide is sorbed by the porous concrete at a rate of at least about 0.1 grams of carbon dioxide per gram of porous concrete per minute or at least about 0.25 grams of carbon dioxide per gram of porous concrete per minute. In some cases, the carbon dioxide is sorbed by the porous concrete at a rate of 0.001-0.25 grams of carbon dioxide per gram of porous concrete per minute, 0.01-0.1 grams of carbon dioxide per gram of porous concrete per minute, 0.05-0.15 grams of carbon dioxide per gram of porous concrete per minute, or 0.1-0.25 grams of carbon dioxide per gram of porous concrete per minute. Moreover, as described further hereinbelow, the rate of carbon dioxide sorption achieved by a method described herein, in some cases, can be selected as desired based on one or more of the total surface area of the porous concrete, the porosity of the porous concrete, the pore size distribution of the porous concrete, the pH of the porous concrete, the water content of the porous concrete, and the chemical composition of the porous concrete.

Additionally, carbon dioxide can be flowed into and/or sorbed by a porous concrete composition described herein in large amounts. In some embodiments, for instance, the concentration or amount of carbon dioxide flowed into the pore structure of the porous concrete is greater than the atmospheric concentration of carbon dioxide. Moreover, in some cases, flowing carbon dioxide into the pore structure of the porous concrete comprises disposing, sequestering, or storing the carbon dioxide in the porous concrete in an amount up to about 50 weight percent, based on the total weight of the porous concrete. In some embodiments, the carbon dioxide is present in the porous concrete is an amount of about 1 weight percent to about 50 weight percent, about 1 weight percent to about 33 weight percent, about 1 weight percent to about 25 weight percent, about 5 weight percent to about 33 weight percent, about 5 weight percent to about 25 weight percent, or about 10 weight percent to about 20 weight percent, based on the total weight of the porous concrete.

Moreover, in some cases, carbon dioxide can be flowed into and/or sorbed by a porous concrete composition described herein at relatively high pressure and/or relatively low temperature. For example, in some embodiments, carbon dioxide can be flowed into a porous concrete composition described herein at a pressure of about 30 psi to about 500 psi, about 50 psi to about 300 psi, or about 100 psi to about 200 psi. Additionally, in some cases, carbon dioxide can be flowed into a porous concrete composition described herein at an ambient temperature, such as a temperature between about 15° C. and about 40° C., between about 15° C. and about 35° C., or between about 20° C. and about 30° C.

Further, in some embodiments, a method of storing carbon described herein can be carried out when the porous concrete is substantially cured or when the porous concrete is at least partially uncured. For example, in some instances, flowing carbon dioxide into the pore structure of the porous concrete comprises providing an uncured porous concrete composition and curing the uncured porous concrete composition in the presence of the carbon dioxide.

"Curing" a concrete composition, for reference purposes herein, comprises hardening, setting, or hydrating the concrete composition. Moreover, curing a concrete composition, in some embodiments, comprises substantially curing or completely curing the composition. "Substantially" curing a concrete composition can comprise completing at least about 60 percent, at least about 70 percent, at least about 80 percent, at least about 90 percent, at least about 95 percent, or at least about 99 percent of the curing. As understood by one of ordinary skill in the art, the degree of curing can be determined based on one or more of the hydration of the concrete composition, the workability of the concrete composition, the viscosity of the concrete composition, the mechanical strength of the concrete composition, and the residual water content of the concrete composition. For example, a completely "cured" concrete composition can be completely hydrated and can contain little or no residual water. In addition, in some cases, a "substantially cured" concrete composition has undergone at least about 60 percent, at least about 70 percent, at least about 80 percent, at least about 90 percent, at least about 95 percent, or at least about 99 percent of the hydration reactions associated with curing.

An "uncured" concrete composition, for reference purposes herein, comprises a concrete composition that is not substantially cured. For instance, an uncured concrete composition can comprise a composition in which less than about 60 percent, less than about 50 percent, less than about 40 percent, less than about 30 percent, less than about 20 percent, less than about 10 percent, less than about 5 percent, less than about 1 percent, or less than about 0.1 percent of the curing has occurred. In some embodiments, an uncured concrete composition comprises a composition in which no curing has occurred. Further, in some cases, an uncured concrete composition comprises water such as residual water. Such water can, in some embodiments, be contained in the pores of the pore structure of the uncured concrete composition and can facilitate sorption of carbon dioxide by the concrete composition.

In some embodiments comprising the use of an uncured porous concrete composition, the uncured porous concrete composition comprises a cement and/or filler material described hereinabove and further comprises water and a blowing or foaming agent. The use of a blowing or foaming agent in the uncured concrete composition can provide a concrete composition having a porous structure, such as a macroporous and microporous structure described herein. Any blowing or foaming agent not inconsistent with the objectives of the present invention may be used. For example, in some embodiments, a blowing or foaming agent comprises aluminum powder. A blowing or foaming agent may also be used in any amount not inconsistent with the objectives of the present invention. In some cases, for instance, a blowing or foaming agent is present in an uncured porous concrete composition in an amount up to about 20 weight percent, up to about 15 weight percent, or up to about 10 weight percent, based on the total weight of the uncured porous concrete composition.

In addition, in some cases, an uncured porous concrete composition described herein has an acidic pH, such as a pH of about 5 or less, about 4 or less, about 3 or less, or about 2 or less. In some embodiments, an uncured porous concrete composition has a pH between about 1 and about 6, between about 1 and about 4, between about 2 and about 4, or between about 2 and about 3.

Further, in some instances, the curing of an uncured porous concrete composition is carried out at an elevated pressure. For example, in some embodiments, curing is carried out at a pressure of about 30 psi to about 500 psi, about 50 psi to about 300 psi, or about 100 psi to about 200 psi.

Moreover, in some cases, the curing of an uncured porous concrete composition described herein is carried out at a constant temperature. A "constant" temperature, for reference purposes herein, comprises a temperature that varies by less than about 10° C. or less than about 5° C. during the curing process. Further, in some embodiments, curing is carried out at a relatively low temperature or at an ambient temperature. Curing at "ambient" temperature, for reference purposes herein, comprises curing without heating or cooling the uncured porous concrete composition away from the ambient temperature of the environment. However, as understood by one of ordinary skill in the art, a curing process can be exothermic. In addition, providing a pressurized gas can have a cooling effect. Thus, in some instances, curing at ambient temperature comprises curing without heating or cooling the uncured porous concrete composition in a manner other than that inherent in the process of curing the uncured concrete composition in the presence of carbon dioxide as described herein. In some embodiments, an ambient temperature is between about 20° C. and about 40° C., between about 15° C. and about 35° C., or between about 20° C. and about 30° C.

In addition to carbon dioxide, a method of storing a combustion waste product described herein can also comprise storing a solid combustion waste product such as coal ash. A method of storing coal ash, in some cases, comprises mixing coal ash and cement to provide an uncured concrete composition and curing the uncured concrete composition. Additionally, in some instances, the uncured concrete composition further comprises water and a blowing or foaming agent. The coal ash, cement, and blowing agent can comprise any coal ash, cement, and blowing or foaming agent described hereinabove. In addition, the curing of the uncured concrete composition can be carried out in any manner described hereinabove, including at an elevated pressure and/or at a constant or ambient temperature.

A method of storing a combustion waste product described herein can be carried out using any equipment or apparatus not inconsistent with the objectives of the present invention. In some instances, for example, a method of storing a combustion waste product can be carried out using the apparatus of FIG. 1, as described further hereinbelow.

It is further to be understood that a method of storing a combustion waste product described herein can be carried out using any suitable combination of compositions, apparatus, and specific steps described herein. For example, any cured or uncured porous concrete composition described herein can be used with any combustion flue gas source described herein, with any carbon dioxide pressure described herein, and/or with any curing time or temperature described herein.

II. Carbon Storage Systems

In another aspect, carbon storage systems are described herein. In some embodiments, a carbon storage system comprises a source of carbon dioxide captured from combustion flue gas and a carbon dioxide storage medium comprising porous concrete having a macroporous and microporous pore structure. Moreover, a carbon storage system described herein, in some embodiments, further comprises one or more conduits for delivering the captured carbon dioxide to the porous concrete. In some cases, the source of carbon dioxide is adapted to provide pressurized or compressed carbon dioxide to the porous concrete, including carbon dioxide having a pressure of about 30 psi to about 500 psi, about 50 psi to about 300 psi, or about 100 psi to about 200 psi. In addition, a carbon storage system described herein can also include one or more other components, such as one or more carbon dioxide storage tanks coupled to the one or more conduits or one or more sensors for measuring structural stress or carbon dioxide content in or near the carbon dioxide storage medium. Further, it is to be understood that a carbon storage system described herein can also comprise a source of carbon dioxide wherein the carbon dioxide is not necessarily captured from combustion flue gas.

Turning now to specific components of carbon storage systems, carbon storage systems described herein, in some embodiments, comprise a source of carbon dioxide captured from combustion flue gas. Any source of carbon dioxide not inconsistent with the objectives of the present invention may be used. In some instances, for example, the source of carbon dioxide comprises a tank or pipeline. In other cases, the source of carbon dioxide comprises a combustion flue gas exhaust outlet. Moreover, the carbon dioxide can be captured or obtained in any manner and from any combustion flue gas source not inconsistent with the objectives of the present invention, including in a manner described hereinabove in Section I. For example, in some cases, the combustion flue gas comprises flue gas from a fossil fuel-burning apparatus such as an industrial furnace, boiler, steam generator, or power plant. In some instances, a combustion flue gas source is a coal-burning, petroleum-burning, or natural gas-burning furnace, boiler, steam generator, or power plant. Moreover, in some embodiments, the combustion flue gas is obtained from a stationary source, as opposed to a mobile source such as an automobile, boat, airplane, or other vehicle.

A carbon storage system described herein also comprises a carbon dioxide storage medium comprising porous concrete. Any carbon dioxide storage medium and porous concrete not inconsistent with the objectives of the present invention may be used. In some embodiments, for instance, the porous concrete comprises a porous concrete described hereinabove in Section I. Any porous concrete described hereinabove in Section I may be used.

Additionally, a carbon storage system described herein, in some embodiments, further comprises one or more conduits for delivering carbon dioxide to the porous concrete. Any conduit not inconsistent with the objectives of the present invention may be used. In some embodiments, one or more conduits comprise a pipe segment or hose. Further, a conduit such as a pipe segment or hose can have any size and be formed of any material not inconsistent with the objectives of the present invention. In some cases, for example, a conduit of a system described herein is formed of metal, ceramic, plastic, rubber, or a composite material such as a fiberglass composite material.

A carbon storage system described herein can also include one or more other components, such as one or more carbon dioxide storage tanks coupled to the one or more conduits or one or more sensors for measuring carbon dioxide content in or near the carbon dioxide storage medium. Any storage tank, sensor, or other additional component not inconsistent with the objectives of the present invention may be used. For example, in some cases, a system further comprises one or more pressurized ground storage tanks. In addition, in some instances, a sensor comprises one or more of a stress sensor, a pressure sensor, a groundwater sensor, and a carbon dioxide sensor.

It is further to be understood that a carbon storage system described herein can comprise any combination of components described herein not inconsistent with the objectives of the present invention. For example, any cured or uncured porous concrete composition described herein can be used with any combustion flue gas source described herein, with any carbon dioxide pressure described herein, and/or with any sensors described herein.

Figure 2:
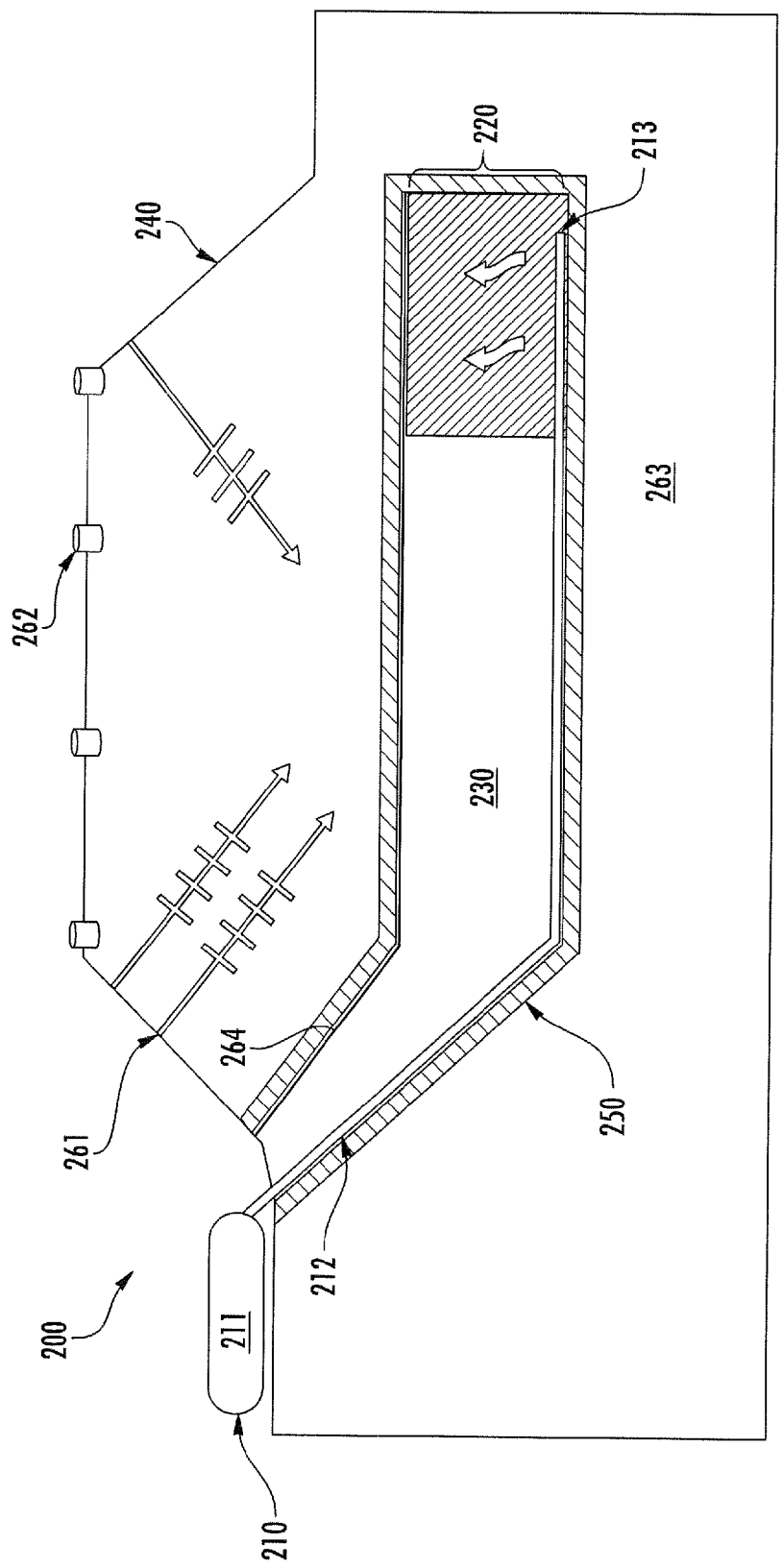
FIG. 2 illustrates a carbon storage system according to one embodiment described herein.

Some non-limiting exemplary embodiments of carbon storage systems will now be further described with reference to the figures. FIG. 2 illustrates a schematic view of a carbon storage system according to one embodiment described herein. As illustrated in FIG. 2, carbon storage system (200) comprises a source (210) of carbon dioxide captured from combustion flue gas (not shown) and a carbon dioxide storage medium comprising porous concrete (220) having a macroporous and microporous pore structure. The carbon storage system (200) further comprises a carbon dioxide storage tank (211) and a conduit (212) for delivering the captured carbon dioxide from the storage tank (211) to the porous concrete (220).

The carbon storage system (200) of FIG. 2 is adapted for the storage of carbon dioxide in a shallow mine (230) under the surface (240) of the ground. Specifically, the carbon dioxide is transported from the storage tank (211) located at the surface (240) through the conduit (212) and into the porous concrete (220), the carbon dioxide exiting the conduit (212)

through distal end (213) of the conduit (212). The distal end (213) of the conduit (212) is positioned at the bottom of the porous concrete (220). Therefore, the carbon dioxide penetrates into the porous concrete (220) in a generally upward direction, as indicated by the arrows in FIG. 2.

The porous concrete (220) can be cured or uncured during transportation and/or penetration of the carbon dioxide to and/or into the porous concrete (220). Further, as described hereinabove, an uncured porous concrete (220) can be cured during and/or after the carbon dioxide is provided to the porous concrete (220) from the carbon source (210).

As illustrated in FIG. 2, the carbon storage system (200) also comprises a plurality of sensors for monitoring the conditions in or near the porous concrete (220) and the mine (230). Specifically, soil stress sensors (261) are disposed within the ground above the mine (230). Passive surface geophysical and/or geochemical monitoring is also carried out using ground sensors (262). Groundwater monitoring is carried out using sensors disposed below the mine (230) in a groundwater monitoring area (263). In addition, the structural integrity of the mine (230) and/or porous concrete (220) can be monitored using sensors (264) disposed near the porous concrete (220) and/or the opening of the mine (230). The various sensors and monitoring regions (261, 262, 263, 264) can be used to measure structural stress or carbon dioxide content in or near the carbon dioxide storage medium to prevent or minimize structural failure of the mine (230) or the porous concrete (220) or the accidental or other release of carbon dioxide sequestered in the porous concrete (220). As a further prophylactic measure, carbon storage system (200) also comprises liner (250) surrounding the mine (230) and porous concrete (220). The liner (250) can comprise a gas and/or water impermeable material such as a Geo-Bag.

Figure 3:
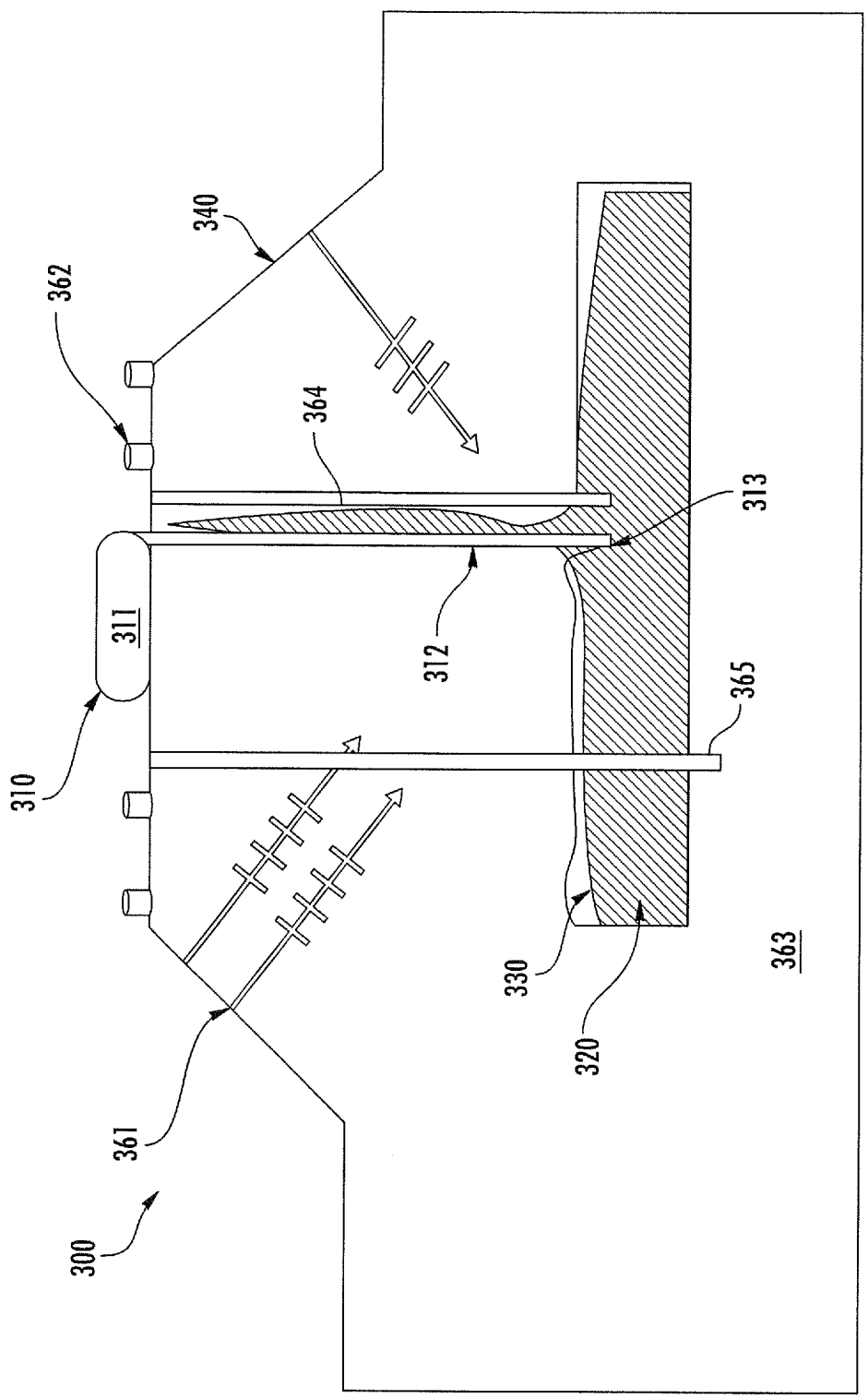
FIG. 3 illustrates a carbon storage system according to one embodiment described herein.

FIG. 3 illustrates a schematic view of another carbon storage system according to one embodiment described herein. In contrast to the carbon storage system (200) of FIG. 2, the carbon storage system (300) of FIG. 3 is configured for sequestration of carbon dioxide in a deep mine, as opposed to a shallow mine. As illustrated in FIG. 3, carbon storage system (300) comprises a source (310) of carbon dioxide captured from combustion flue gas and a carbon dioxide storage medium comprising porous concrete (320) having a macroporous and microporous pore structure. The carbon storage system (300) further comprises a carbon dioxide storage tank (311) and a conduit (312) for delivering the captured carbon dioxide from the storage tank (311) to the porous concrete (320).

As noted above, the carbon storage system (300) of FIG. 3 is adapted for the storage of carbon dioxide in a deep mine (330) under the surface (340) of the ground. Specifically, the carbon dioxide is transported from the storage tank (311) through the conduit (312) and into the porous concrete (320) disposed deep beneath the surface (340). The carbon dioxide exits the conduit (312) through the distal end (313), which is positioned within the porous concrete (320). If desired, the porous concrete (320) can be poured into the mine (330) from the surface (340) in a substantially uncured state. The porous concrete (320) can then be cured during and/or after the carbon dioxide is provided to the porous concrete (320) from the carbon source (310).

As illustrated in FIG. 3, the carbon storage system (300) also comprises a plurality of sensors for monitoring the conditions in or near the porous concrete (320) and the mine (330). Specifically, soil stress sensors (361) are disposed within the ground above the mine (330). Passive surface geophysical and/or geochemical monitoring is also carried out using ground sensors (362). Groundwater monitoring is carried out using sensors disposed below the mine (330) in a groundwater monitoring area (363). In addition, the structural integrity of the mine (330) and/or porous concrete (320) can be monitored using sensors (364). Further monitoring can also be carried out using monitoring well (365). The various sensors and monitoring regions (361, 362, 363, 364, 365) can be used to measure structural stress or carbon dioxide content in or near the carbon dioxide storage medium to prevent or minimize structural failure of the mine (330) or the porous concrete (320) or the accidental or other release of carbon dioxide sequestered in the porous concrete (320).

III. Compositions Comprising One or More Combustion Waste Products

In another aspect, compositions comprising one or more combustion waste products are described herein. In some embodiments, a composition described herein comprises porous concrete having a macroporous and microporous pore structure, the porous concrete comprising a mixture of coal ash and cement. In addition, in some cases, the composition further comprises carbon dioxide residing within the porous concrete.

In other instances, a composition described herein does not necessarily comprise a porous concrete comprising a mixture of coal ash and cement. Instead, in some cases, a composition can comprise porous concrete having a macroporous and microporous pore structure and carbon dioxide residing within the porous concrete, wherein the porous concrete does not comprise coal ash.

Further, in some embodiments, the porous concrete of a composition described herein is at least partially uncured. In other instances, the porous concrete is substantially cured. Moreover, in some embodiments, a composition described herein does not comprise reinforcement bars or "rebar."

Turning now to specific components of compositions, compositions described herein comprise porous concrete. The porous concrete can comprise any porous concrete described hereinabove in Section I. In addition, the various components of the porous concrete, such as the coal ash, cement, and/or carbon dioxide residing within the porous concrete, can be present in any amount not inconsistent with the objectives of the present invention, including in an amount described hereinabove in Section I or Table 1. For example, in some embodiments comprising coal ash, the coal ash is present in the porous concrete in an amount between about 5 weight percent and about 90 weight percent, based on the total weight of the porous concrete. Similarly, in some embodiments comprising carbon dioxide, the carbon dioxide is present in the porous concrete in an amount greater than about 1 weight percent, based on the total weight of the porous concrete. In some cases, the carbon dioxide is present in the porous concrete in an amount of about 1 weight percent to about 50 weight percent, about 1 weight percent to about 33 weight percent, about 1 weight percent to about 25 weight percent, about 5 weight percent to about 33 weight percent, about 5 weight percent to about 25 weight percent, or about 10 weight percent to about 20 weight percent, based on the total weight of the porous concrete.

Moreover, in some embodiments, the carbon dioxide is present in the porous concrete at a depth of more than 5 cm or more than 100 cm from the surface of the porous concrete. In some cases, the carbon dioxide is present in the porous concrete at a depth between about 1 cm and about 500 cm, between about 1 cm and about 250 cm, between about 5 cm and about 250 cm, between about 10 cm and about 100 cm, or between about 50 cm and about 250 cm. Further, in some instances, the carbon dioxide is dispersed throughout the entire volume of the porous concrete.

It is further to be understood that a composition described herein can comprise any combination of components described herein not inconsistent with the objectives of the present invention. For example, a composition can comprise any cured or uncured porous concrete composition described herein in combination with any amount of carbon dioxide described herein in combination with any penetration depth or distribution of carbon dioxide within the composition described herein. Moreover, as understood by one of ordinary skill in the art, compositions described herein can be formed by a method described hereinabove in Section I. Other methods may also be used.

IV. Apparatus and Methods of Measuring Sorption of a Gas

In another aspect, apparatus and methods of measuring the sorption of a gas such as carbon dioxide by a sorption material such as porous concrete are described herein. In some embodiments, the measured sorption comprises chemisorption and/or physisorption of the gas by the sorption material, as described further hereinabove. Thus, unlike some other apparatus and methods, an apparatus and/or method described herein can be used to measure both chemisorption and physisorption of a gas by a sorption material. In addition, in some embodiments of apparatus and/or methods described herein, the sorption gas comprises carbon dioxide and the sorption material comprises porous concrete having a macroporous and microporous pore structure. In some cases, the sorption gas comprises a flue gas comprising carbon dioxide. The porous concrete can comprise any porous concrete described hereinabove in Section I and/or Section III.

An apparatus for measuring the sorption of a gas by a sorption material described herein, in some embodiments, comprises a sample chamber having a first volume; a reference chamber having a second volume and being in selective fluid communication with the sample chamber; a source of sorption gas adapted to provide the sorption gas to the reference chamber; a pressure gauge configured to measure the pressure inside the sample chamber; and an isothermal bath adapted to maintain the sample chamber and the reference chamber at a constant temperature during measurement of the sorption of the sorption gas by the sorption material. Further, in some embodiments, the sample chamber and the reference chamber are at least partially submerged in the isothermal bath.

Turning now to specific components of apparatus, apparatus described herein comprise a sample chamber having a first volume. The sample chamber can be formed of any material and have any shape, structure, and/or volume not inconsistent with the objectives of the present invention. For example, in some embodiments, the sample chamber is formed from a metal such as stainless steel. Other materials may also be used. Additionally, in some instances, the sample chamber has a size, shape, and/or volume adapted to contain a sorption material having a mass of at least about 1 g or at least 10 g. In some embodiments, the sample chamber is adapted to contain a sorption material having a mass of about 1 g to about 100 g, about 5 g to about 80 g, or about 10 g to about 50 g.

Apparatus described herein also comprise a reference chamber having a second volume. As with the sample chamber, the reference chamber of an apparatus described herein can be formed of any material and have any shape, structure, and/or volume not inconsistent with the objectives of the present invention. For example, in some embodiments, the reference chamber is formed from a metal such as stainless steel.

Apparatus described herein also comprise a source of sorption gas. Any source of sorption gas not inconsistent with the objectives of the present invention may be used. In some cases, a source of sorption gas comprises a carbon dioxide source described hereinabove in Section I or Section II. For example, in some instances, a source of sorption gas comprises a source of pressurized or compressed carbon dioxide.

Apparatus described herein also comprise one or more pressure gauges. Any pressure gauge not inconsistent with the objectives of the present invention may be used. In some embodiments, for instance, a pressure gauge comprises an electronic pressure gauge.

Apparatus described herein also comprise an isothermal bath. An isothermal bath, for reference purposes herein, comprises a bath configured to maintain one or more components of an apparatus described herein at a constant temperature. Any isothermal bath not inconsistent with the objectives of the present invention may be used. In some cases, an isothermal bath comprises a liquid bath such as a water bath or oil bath. Moreover, an isothermal bath described herein can be maintained at any desired temperature not inconsistent with the objectives of the present invention. For example, in some instances, an isothermal bath is maintained at an ambient temperature described herein, such as a temperature between about 15° C. and about 40° C., between about 15° C. and about 35° C., or between about 20° C. and about 30° C.

It is further to be understood that an apparatus described herein can comprise any combination of components described herein not inconsistent with the objectives of the present invention. For example, an apparatus can comprise any sample chamber described herein in combination with any reference chamber described herein in combination with any pressure gauge described herein in combination with any isothermal bath described herein in combination with any sorption material described herein in combination with any sorption gas described herein.

One non-limiting exemplary embodiment of an apparatus described herein will now be further described with reference to the figures. As illustrated in FIG. 1, apparatus (100) comprises a sample chamber (110) having a first interior volume (111) and a lid or seal (112). A sorption material (120) is disposed in the sample chamber (110). In addition to providing access to the first interior volume (111) for addition or removal of a sorption material (120), the lid or seal (112) can also provide an airtight and/or watertight seal to the sample chamber (110) during use of the apparatus (100).

In the embodiment of FIG. 1, the sample chamber (110) also comprises a first connector (113), a second connector (114), and a third connector (115). The connectors (113, 114, 115) can provide fluid communication between the interior volume (111) of the sample chamber (110) and other portions of the apparatus (100), as described further hereinbelow. For example, first connector (113) can be used to provide fluid communication between the interior volume (111) of the sample chamber (110) and a vacuum pump (140). The vacuum pump (140) can be used to completely or partially evacuate the sample chamber (110) as needed or desired, as described further hereinbelow.

Similarly, the second connector (114) can provide fluid communication between the interior volume (111) of the sample chamber (110) and the pressure gauge (163) disposed in conduit or pipe segment (162). The pressure gauge (163) can be configured to measure the pressure inside the sample chamber (110) and also report the pressure inside the sample chamber (110) at one or more desired time points to the data logger (161) and/or data processing system (160), as described further hereinbelow.

The third connector (115) can be used to provide fluid communication between the interior volume (111) of the sample chamber (110) and a reference chamber (130) of the apparatus (100). The reference chamber (130) has a second interior volume (131). Selective fluid communication between the reference chamber (130) and the sample chamber (110) is provided by means of third connector (115) and pressure control valve (133) disposed in the conduit or pipe segment (132).

As illustrated in FIG. 1, a source (150) of sorption gas is adapted to provide the sorption gas to the reference chamber (130) by means of conduit or pipe segment (152). In the embodiment of FIG. 1, the gas source (150) is a cylinder of compressed gas having a pressure control valve (151). However, as understood by one of ordinary skill in the art, other sources of gas may also be used, instead of or in addition to a cylinder of compressed gas. Further, in addition to the pressure control valve (151), an additional pressure control valve (153) and a pressure gauge (154) are also disposed in conduit or pipe segment (152). The pressure control valves (151, 153) can be used to provide a desired pressure of sorption gas to the apparatus, including by reducing the pressure of the compressed gas source (150), which may in some cases be higher than desired for a sorption experiment described herein. The pressure gauge (154) can be used to indicate when the desired sorption gas pressure is achieved. In addition, when pressure control valve (133) is open, the pressure gauge (154) can be used as a redundant pressure gauge to measure the pressure inside the sample chamber (110), thereby providing a backup measurement for the pressure gauge (163).

The apparatus (100) also includes an isothermal bath (180) adapted to maintain the sample chamber (110) and the reference chamber (130) at a constant temperature during measurement of the sorption of the sorption gas by the sorption material (120). As illustrated in FIG. 1, the sample chamber (110) and the reference chamber (130) are completely submerged beneath the surface level (181) of the isothermal bath (180). However, as understood by one of ordinary skill in the art, other configurations are also possible. Further, in the embodiment of FIG. 1, the apparatus (100) also comprises a temperature indicator (182) disposed in the isothermal bath (180). If desired, the temperature indicator (182) may also be coupled to a heating or cooling element (not shown) configured to help maintain the desired temperature of the isothermal bath (180) as needed.

The apparatus (100) of FIG. 1 also comprises an analytical system (170) in selective fluid communication with the interior volume (111) of the sample chamber (110) by means of conduit or pipe segment (171), pressure control valve (172), and connector (173). The analytical system (170) can comprise a system for analyzing the chemical identity and/or amount of one or more gases present in the interior volume (111) of the sample chamber (110). For example, in some instances, the analytical system (170) can comprise a gas chromatograph system, such as a gas chromatograph system configured to detect and/or quantify carbon dioxide.

As described herein, an apparatus such as the apparatus (100) of FIG. 1 can be used to measure the sorption of a gas by a sorption material. In some embodiments, a method of measuring the sorption of a gas by a sorption material described herein comprises disposing the sorption material in a sample chamber having a first volume; disposing the gas at an initial pressure in a reference chamber having a second volume; removing the atmosphere from the sample chamber to provide a vacuum in the sample chamber; transferring at least a portion of the gas from the reference chamber to the sample chamber; measuring the pressure of the gas in the sample chamber; and determining the amount of sorption of the gas by the sorption material based on the first volume, the second volume, the initial pressure, and the measured pressure of the gas in the sample chamber. Further, in some cases, the sample chamber and the reference chamber are maintained at a constant temperature during the sorption process. Moreover, a method described herein, in some embodiments, can be used to measure the sorption profile of a sorption material, such as by determining the amount of sorption of the gas at a plurality of different time points. A method described herein can also be used to measure sorption by a wet sorption material or a dry sorption material. Thus, in some cases, a sorption material described herein such as a porous concrete described herein is at least partially uncured when disposed in the sample chamber and the method further comprises curing the porous concrete, including in a manner described hereinabove in Section I.

Determining the amount of gas sorption by the sorption material based on a first volume, a second volume, an initial pressure, and a measured pressure of the gas in the sample chamber, in some embodiments, can be carried out using Equations (1) through (3):

$$m_{gas}^{absorbed} = m_{gas}^{injected} - m_{gas}^{unabsorbed}, \quad (1)$$

$$m_{gas}^{injected} = \left(\frac{P_{initial} V_{void} M}{ZRT}\right), \text{ and} \quad (2)$$

$$m_{gas}^{unabsorbed} = \left(\frac{P_{left} V_{void} M}{ZRT}\right), \quad (3)$$

wherein $m_{gas}^{absorbed}$ is the mass of the sorption gas that is sorbed by the sorption material (by any process, including absorption, adsorption, chemisorption, and/or physisorption), $m_{gas}^{unabsorbed}$ is the mass of the sorption gas that is not sorbed by the sorption material, $m_{gas}^{injected}$ is the mass of the sorption gas that is present at the beginning of the sorption process (i.e., once $P_{initial}$ is reached in the sample chamber), $P_{initial}$ is the pressure of the sorption gas at the beginning of the sorption process (e.g., 150 psi in Example 2 below), $P_{left}$ is the pressure of the sorption gas at the end of the sorption process or at a desired time point (e.g., right before the pressure is released from the sample chamber after the desired sorption period, such as 48 hours), $V_{void}$ is the total volume of the closed system that includes the interior volume of the sample chamber, M is the molar mass of the sorption gas species (e.g., $CO_2$), Z is the compressibility coefficient of the pure sorption gas species (e.g., $CO_2$), R is the universal gas constant, and T is the system temperature.

V. Methods of Backfilling

In another aspect, methods of backfilling are described herein. In some embodiments, a method of backfilling comprises disposing a backfill material in a void to completely, substantially completely, or at least partially fill the void, the backfill material comprising a porous concrete described hereinabove in Section I or a composition described hereinabove in Section III. Any such porous concrete or composition may be used. For example, in some cases, the porous concrete of a backfill material described herein has a macroporous and microporous pore structure and carbon dioxide residing within the porous concrete in an amount greater than 1 weight percent of the porous concrete. In some embodiments, the porous concrete of a backfill material described herein comprises a mixture of coal ash and cement. Further, the porous concrete can be substantially cured or at least partially uncured. Additionally, a backfill material described herein, in some embodiments, can further comprises one or more other components, such as one or more of water, rock, and gravel. When a backfill material comprises at least partially uncured material such as partially uncured concrete, a method of backfilling described herein can further comprise curing the uncured material, including in a method described hereinabove in Section I.

Moreover, the various components of a backfill material described herein can be present in the backfill material in any amount not inconsistent with the objectives of the present invention. In some cases, for instance, a porous concrete or composition described herein is present in the backfill material in an amount up to about 100 weight percent, up to about 95 weight percent, up to about 90 weight percent, up to about 70 weight percent, up about 60 weight percent, up to about 50 weight percent, up to about 30 weight percent, up to about 20 weight percent, up to about 10 weight percent or up to about 5 weight percent, based on the total weight of the backfill material.

In addition, a backfill material described herein can be disposed in any void in any manner not inconsistent with the objectives of the present invention. For example, in some cases, the void of a method described herein comprises a mine or a portion of a mine such as a coal mine or a portion of a coal mine. In some embodiments, the void comprises a space between the floor and ceiling of a mine, so that a backfilling method described herein provides structural support to the mine. The void of a method described herein can also comprise other excavated or eroded areas, including excavated or eroded areas beneath ground structures such as buildings. In addition, a void described herein can have any size and/or shape not inconsistent with the objectives of the present invention.

Disposing a backfill material in a void described herein can be carried out manually or using one or more pieces of equipment, including one or more pieces of heavy machinery. For example, in some cases, an excavator, a cement mixer truck, or specialized backfill machinery is used to dispose backfill material in a void described herein. Moreover, a method of backfilling described herein can comprise one or more of compaction backfilling, water jet backfilling, or flowable fill backfilling.

It is further to be understood that a method of backfilling described herein can be carried out using any suitable combination of compositions, equipment, and specific steps described herein. For example, any cured or uncured porous concrete composition described herein can be used in any amount described herein in combination with any other backfill material component described herein in combination with any manner of backfilling described herein.

Figure 4:
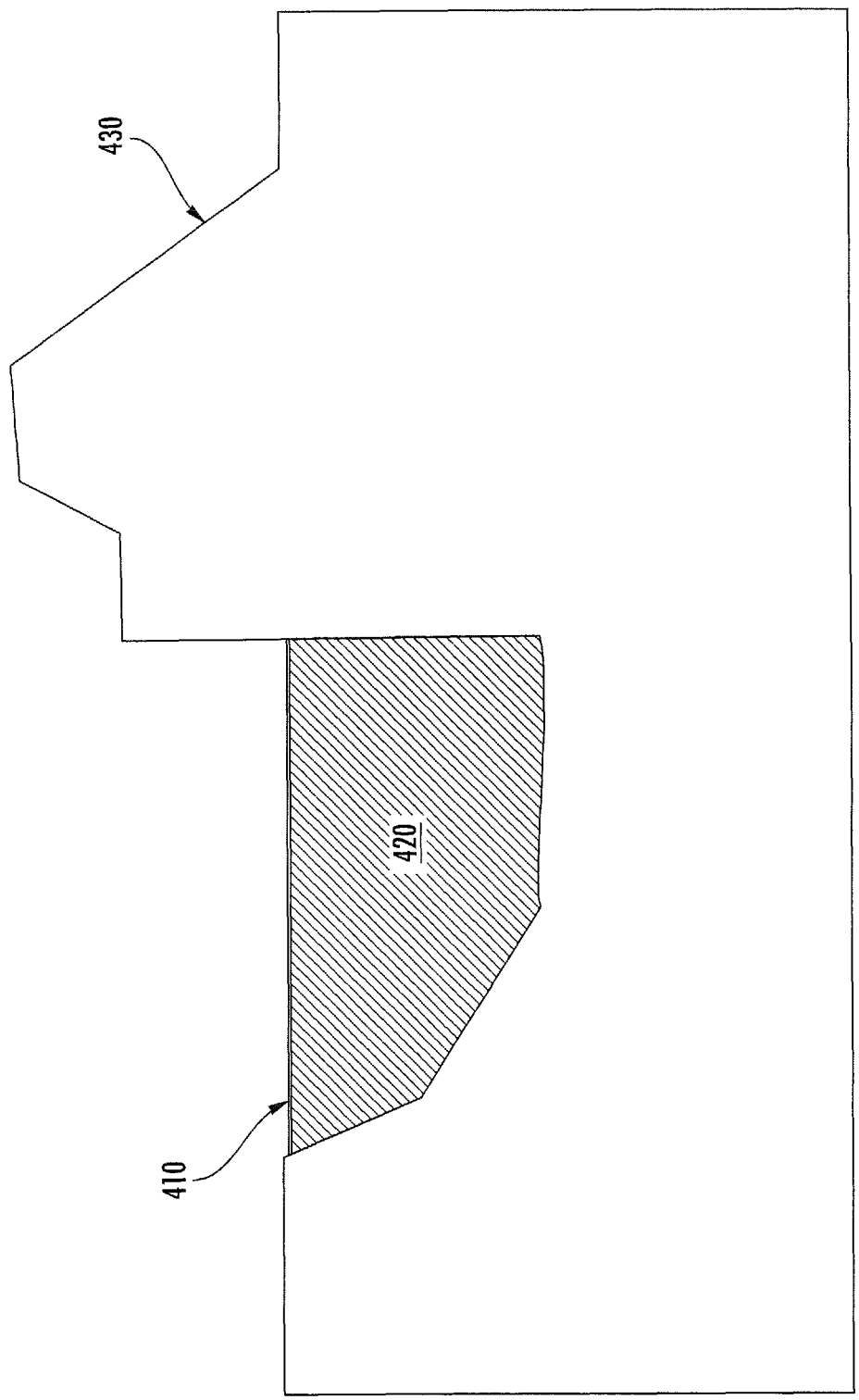
FIG. 4 illustrates a method of backfilling according to one embodiment described herein.

One non-limiting exemplary embodiment of a method of backfilling described herein will now be further illustrated with reference to the figures. As illustrated in FIG. 4, a backfill material (410) is disposed in a surface void (420) to at least partially fill the void (420). Although the embodiment of FIG. 4 illustrates surface backfilling, other void types can also be backfilled using a method described herein.

Additional embodiments will now be further described with reference to the following non-limiting examples.

EXAMPLE 1

Methods of Storing Combustion Waste Products

Methods of storing combustion waste products according to some embodiments described herein were carried out as follows. First, a series of compositions comprising porous concrete were prepared. The compositions were prepared by mixing cement (normal weight ASTM Type I Portland cement), fly ash, water, and aluminum powder (5 micron, ASIN: B007J6Q3JU) in the amounts provided in Table 2. The components were mixed using a mortar and pestle. However, other methods of mixing components of a concrete composition described herein are also possible.

Following preparation of the porous concrete compositions, carbon dioxide was disposed in the pore structure of the porous concrete by curing the concrete in the presence of pressurized carbon dioxide (at an initial pressure of 150 psi). This process was carried out using the apparatus and method described hereinbelow in Example 2.

TABLE 2

| Sample | Cement (g) | Ash (g) | Water (mL) | Aluminum (g) | pH | Initial Weight | $CO_2$ (psi) |
|---|---|---|---|---|---|---|---|
| 1 | 30 | 0 | 14 | 0 | — | 44 | 150 |
| 2 | 30 | 0 | 14 | 0.5 | 8.2 | 44.5 | 150 |
| 3 | 30 | 0 | 14 | 0.5 | 8.2 | 44.5 | 150 |
| 4 | 3 | 27 | 14 | 0.5 | — | 44.5 | 150 |
| 5 | 30 | 0 | 14 | 0.5 | 2.2 | 44.5 | 150 |
| 6 | 3 | 27 | 14 | 0 | — | 44 | 150 |

Figure 5:
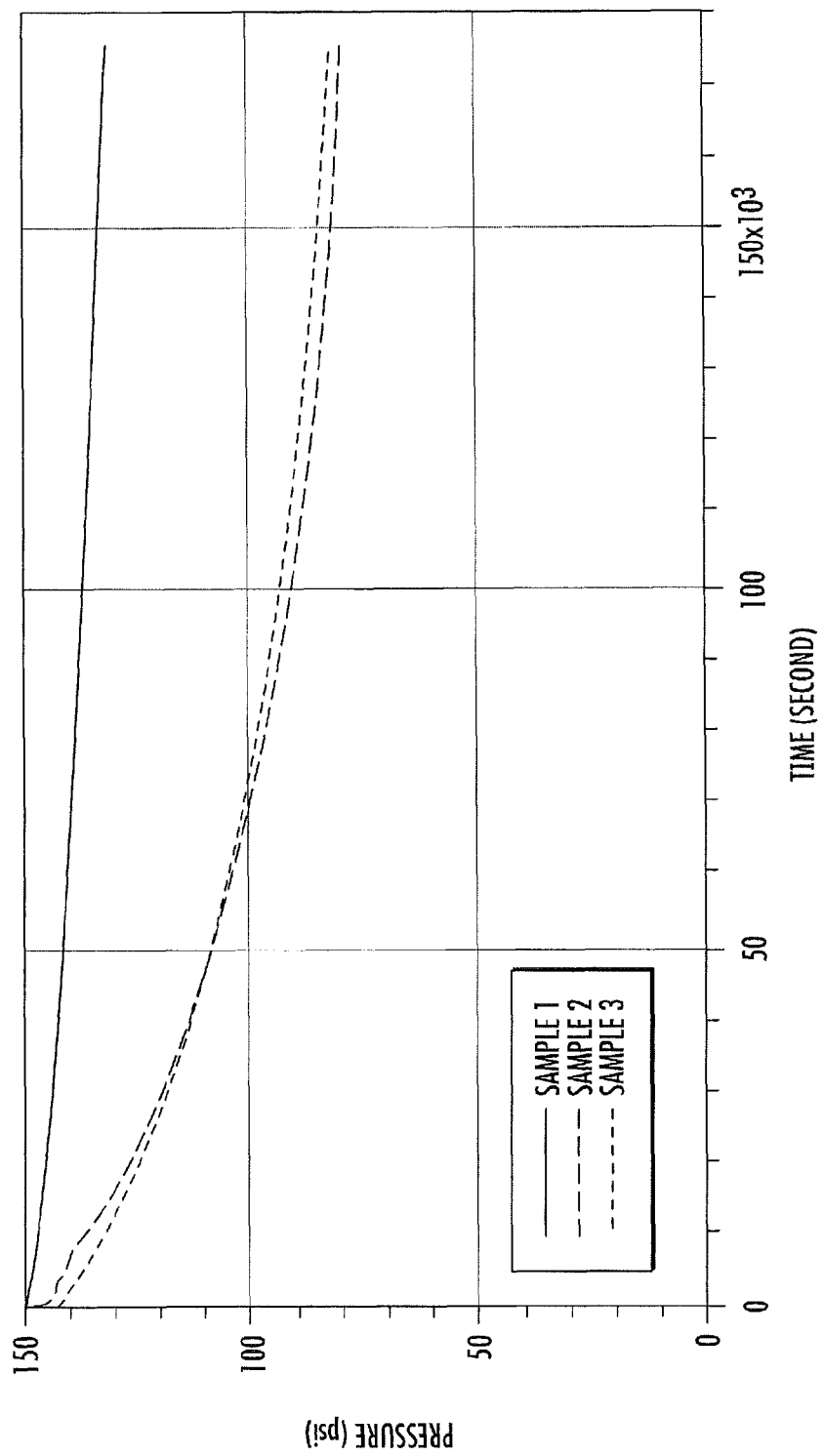
FIG. 5 illustrates the carbon dioxide sorption profile of compositions according to some embodiments described herein.
Figure 6:
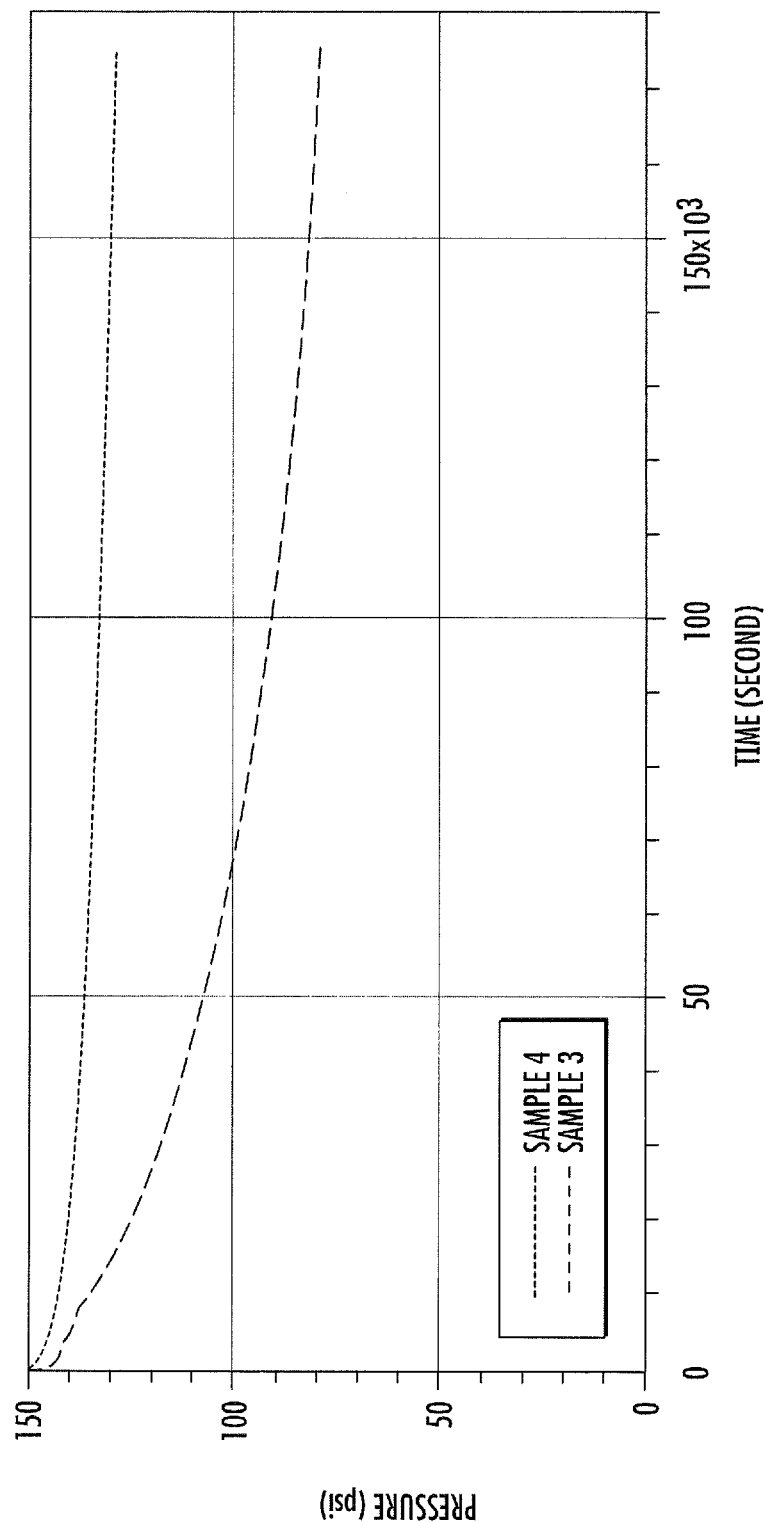
FIG. 6 illustrates the carbon dioxide sorption profile of compositions according to some embodiments described herein.
Figure 7:
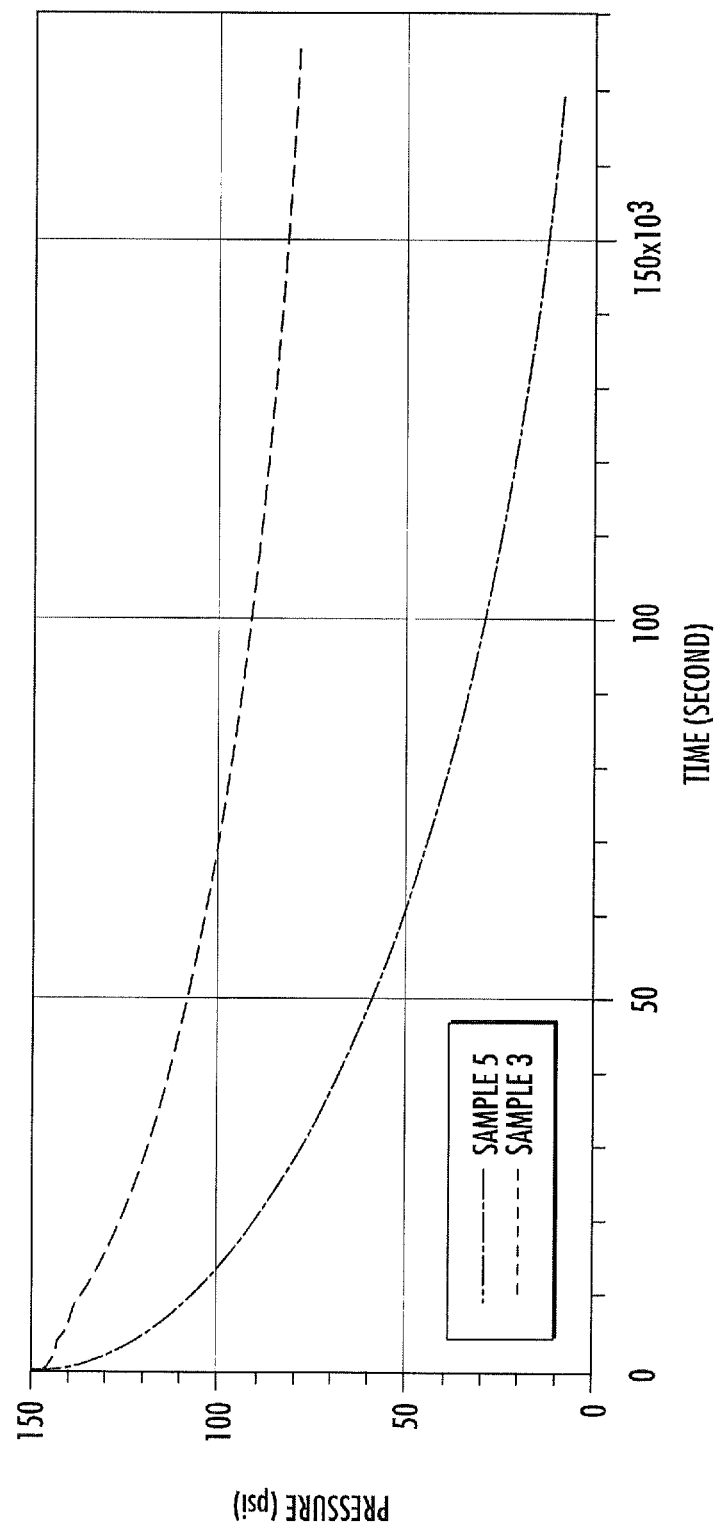
FIG. 7 illustrates the carbon dioxide sorption profile of compositions according to some embodiments described herein.

The amount and rate of carbonation of the samples was also determined as described hereinbelow in Example 2. It should be noted that "carbonation," in this context, can refer to total sorption by physisorption and/or chemisorption. FIGS. 5-7 illustrate curves of carbon dioxide pressure versus time for 48 hours for Samples 1-5, where the time t=0 seconds corresponds to the initial introduction of carbon dioxide to the sample chamber. Not intending to be limited by theory, it is believed that carbonation is increased by increasing the gas permeability of the sorption materials. Thus, the surface area and porosity of a sorption material described herein can both affect carbon dioxide sorption, particularly physisorption (see, e.g., FIG. 5).

Again not intending to be bound by theory, it is also believed that the chemisorption of carbon dioxide can be affected by the water content, pH, and calcium content of the sorption material. For example, as shown in FIG. 6, a higher calcium content can increase the amount of carbonation. Similarly, as shown in FIG. 7, acidic pH can also enhance carbonation, possibly by encouraging carbon dioxide diffusion into saturated pores of the sorption material. In contrast, it is believed that excess water in the sorption material can diminish the rate of sorption by limiting carbon dioxide concentration in the water present on surfaces of the sorption material.

Using Equations (1) through (3) above, the amount of consumed carbon dioxide was calculated for the samples above, where "consumed" carbon dioxide refers to carbon dioxide that is no longer in the gas phase. Some results are provided in Table 3. The "initial weight" in Table 3 refers to the beginning weight of the sorption material samples, prior to carbonation. The "carbonated weight" in Table 3 refers to the weight of the samples following carbonation. It will be noted that the carbonated weights in Table 3 are less than the sum of the initial weights and the consumed carbon dioxide weights. Again not intending to be bound by theory, it is believed that the systematically lower weight is due to the presence of non-reacted carbon dioxide in liquid water present in the sample (and thus not present in the gas phase). Such "non-reacted" carbon dioxide has not undergone a chemisorption reaction such as a carbonation of calcium. It is believed that some of the dissolved but unreacted carbon dioxide can escape from the liquid water and re-enter the gas phase when the pressure is released from the sample chamber following the carbonation process.

TABLE 3

| Sample | Initial Weight (g) | Consumed CO$_2$ (g) | Carbonated Weight (g) | Error (%) |
|---|---|---|---|---|
| 1 | 44 | 2.26 | 45.87 | 0.8 |
| 2 | 44.5 | 3.80 | 47.76 | 1.1 |
| 4 | 44.5 | 1.1 | 45.15 | 0.9 |
| 5 | 44.5 | 15.25 | 58.86 | 1.4 |

Figure 8B:
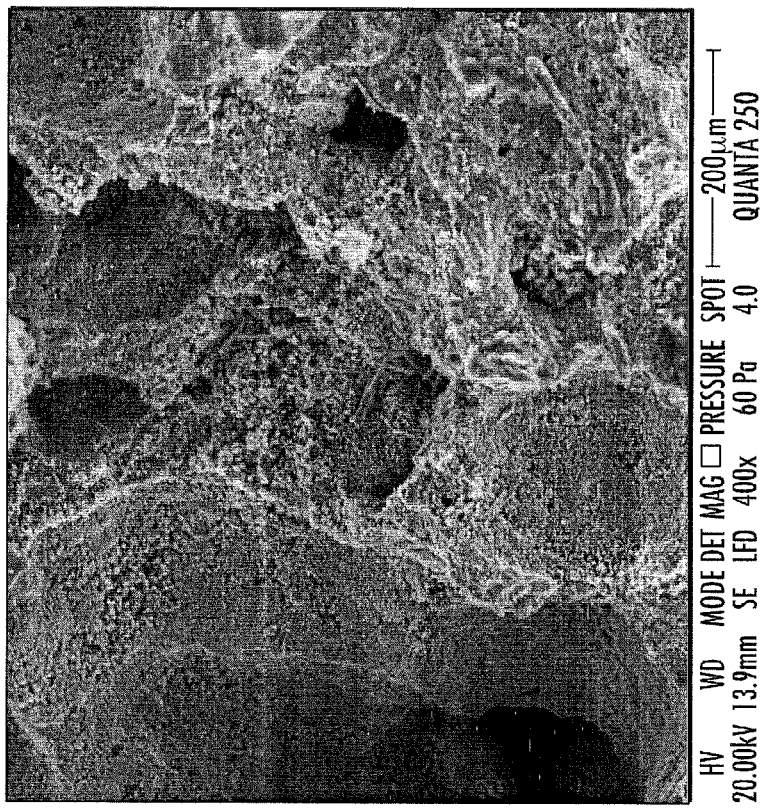
FIG. 8B illustrates an SEM image of a composition according to one embodiment described herein.
Figure 8A:
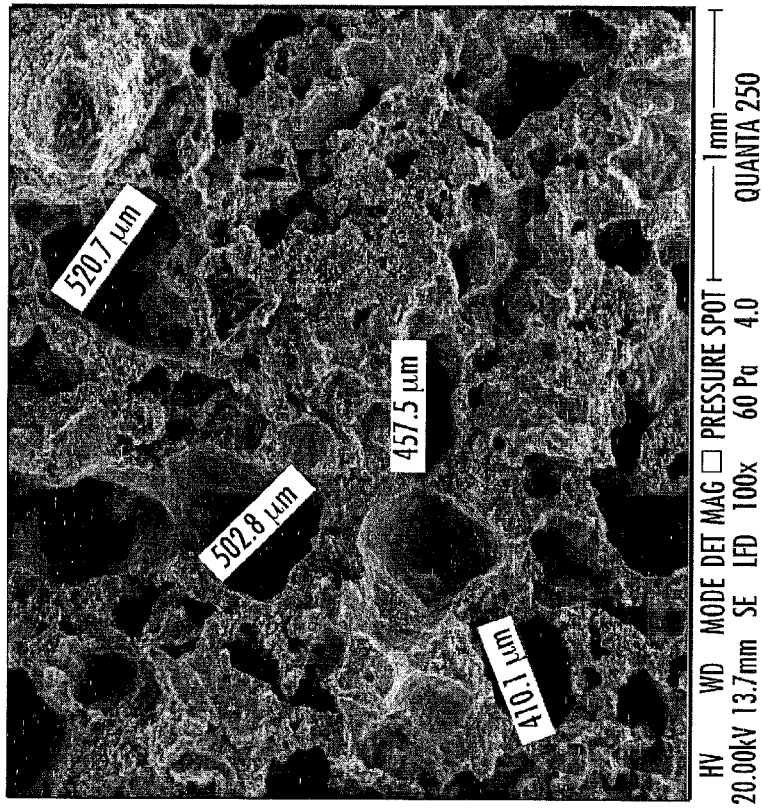
FIG. 8A illustrates a scanning electron microscopy (SEM) image of a composition according to one embodiment described herein.

In addition to the sorption characteristics described above, the morphology of the concrete compositions of Samples 2 and 6 were also examined using an ultra-high resolution SEM. FIG. 8 illustrates SEM images of the composition of Sample 2 following carbonation (i.e., following disposal of carbon dioxide in the porous concrete as described herein). FIG. 8A is an SEM image of the sample at 100× magnification, and FIG. 8B is an SEM image of the sample at 400× magnification. FIG. 9 illustrates SEM images of Sample 6 before and after carbonation. FIG. 9A is an SEM image of Sample 6 prior to carbonation. FIG. 9B is an SEM image of Sample 6 after carbonation.

EXAMPLE 2

Method of Measuring Sorption of Carbon Dioxide

A method of measuring the sorption of carbon dioxide by a sorption material according to one embodiment described herein was carried out as follows. First, an apparatus similar to that described in FIG. 1 was constructed. With reference to FIG. 1, a water bath at a temperature of 22° C. was used as the isothermal bath (180) to maintain the sample chamber (110) and the reference chamber (130) at a constant temperature during execution of the method. Next, carbon dioxide (CO$_2$) gas from a compressed gas cylinder (150) was disposed in the interior volume (131) of the reference chamber (130) at a known initial pressure by means of conduit or pipe segment (152). Pressure control valves (151) and (153) were used to provide a carbon dioxide pressure of about 150 psi, as measured by the pressure sensor (154).

A sorption material (120), such as a sorption material described hereinabove in Example 1, was disposed in the interior volume (111) of the sample chamber (110) of the apparatus (100). The sorption material (120) was in an uncured state and weighed about 44 g to 45 g. The sample chamber (110) was sealed using the lid (112), and the interior volume (111) of the sample chamber (110) was then determined using a known volume of helium as a non-sorbing gas, provided by a helium source (not shown). After evacuating the helium from the sample chamber (110) using vacuum pump (140) to provide a vacuum in the sample chamber (110), carbon dioxide was transferred from the reference chamber (130) to the sample chamber (110) by opening pressure control valve (133) to provide a carbon dioxide pressure of 150 psi inside the system. Pressure control valve (153) was then closed to provide a closed system including the sample chamber (110), the reference chamber (130), the conduit or pipe segment (132), the conduit or pipe segment (162), and the portion of the conduit or pipe segment (152) in between the pressure control valve (153) and the reference chamber (130). The initial pressure of the closed system was about 150 psi.

The sorption material (120) was then cured over the course of 48 hours, without any additional heating or cooling of the system. The pressure of the carbon dioxide in the closed system was monitored during the curing process using the pressure sensor (154) and the pressure sensor (163). The two pressure sensors (154, 163) were provided for redundancy in case one pressure sensor failed during the experiment. Pressure readings were processed by the data logger (161) and the data processing system (160) (a National Instruments NIPXIS1075 system).

The amount of carbon dioxide sorption by the sorption material (120) was then determined using Equations (1) through (3) above.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A method of storing carbon comprising:
providing a carbon dioxide storage medium comprising porous concrete having a macroporous and microporous pore structure; and
flowing carbon dioxide captured from a combustion flue gas source into the pore structure of the porous concrete, wherein the porous concrete has a porosity of about 10 percent to about 70 percent and comprises macropores having a diameter between about 200 µm and about 800 µm and micropores having a diameter between about 100 nm and about 20 µm.

2. The method of claim 1, wherein the porous concrete comprises a mixture of coal ash and cement.

3. The method of claim 1, wherein the carbon dioxide is sorbed by the porous concrete at a rate of at least 0.01 grams of carbon dioxide per gram of porous concrete per minute.

4. The method of claim 1, wherein the carbon dioxide is chemisorbed and physisorbed by the porous concrete.

5. The method of claim 1, wherein the concentration of carbon dioxide flowed into the pore structure of the porous concrete is greater than the atmospheric concentration of carbon dioxide.

6. The method of claim 1, wherein flowing carbon dioxide into the pore structure of the porous concrete comprises disposing the carbon dioxide in the porous concrete in an amount of 5 to 33 weight percent, based on the total weight of the porous concrete.

7. The method of claim 1, wherein the porous concrete is at least partially uncured.

8. The method of claim 1, wherein the porous concrete is substantially cured.

9. The method of claim 1, wherein flowing carbon dioxide into the pore structure of the porous concrete comprises:
providing an uncured porous concrete composition; and
curing the uncured porous concrete composition in the presence of the carbon dioxide.

10. The method of claim 9, wherein the uncured porous concrete composition comprises coal ash, cement, water, and a blowing or foaming agent.

11. The method of claim 9, wherein the uncured porous concrete composition has an acidic pH.

12. The method of claim 9, wherein curing is carried out at a pressure of 30 psi to 500 psi.

13. The method of claim 9, wherein curing is carried out at a constant temperature.

14. The method of claim 9, wherein curing is carried out at ambient temperature.

15. A method of backfilling comprising disposing a backfill material in a void to at least partially fill the void, the backfill material comprising:

porous concrete having a macroporous and microporous pore structure and carbon dioxide residing within the porous concrete in an amount greater than 1 weight percent of the porous concrete, wherein the porous concrete has a porosity of about 10 percent to about 70 percent and comprises macropores having a diameter between about 200 μm and about 800 μm and micropores having a diameter between about 100 nm and about 20 μm.

16. The method of claim 15, wherein the porous concrete comprises a mixture of coal ash and cement.

17. The method of claim 1, wherein the carbon dioxide is present in the carbon dioxide storage medium at a depth of more than 5 cm from the surface of the porous concrete.

18. The method of claim 1, wherein flowing carbon dioxide into the pore structure of the porous concrete comprises flowing compressed carbon dioxide into the porous concrete.

19. The method of claim 1, wherein the coal ash is present in the porous concrete in an amount between 5 weight percent and 90 weight percent, based on the total weight of the porous concrete.

* * * * *